(12) United States Patent
Southerland et al.

(10) Patent No.: US 9,869,848 B2
(45) Date of Patent: *Jan. 16, 2018

(54) SINGLE ELEMENT RADIOMETRIC LENS

(71) Applicant: DRS Network & Imaging Systems, LLC, Melbourne, FL (US)

(72) Inventors: Richard L. Southerland, Plano, TX (US); Mark E. Durham, Palm Bay, FL (US); Patrick J. Cronkite, Palm Bay, FL (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,519

(22) Filed: Feb. 21, 2017

(65) Prior Publication Data

US 2017/0160524 A1 Jun. 8, 2017

Related U.S. Application Data

(63) Continuation of application No. 14/208,560, filed on Mar. 13, 2014, now Pat. No. 9,615,036.

(Continued)

(51) Int. Cl.
*G02B 13/14* (2006.01)
*G02B 7/04* (2006.01)
(Continued)

(52) U.S. Cl.
CPC .............. *G02B 13/14* (2013.01); *G02B 7/04* (2013.01); *H04N 5/2254* (2013.01); *H04N 5/33* (2013.01)

(58) Field of Classification Search
CPC ................................................. H04N 5/23212
(Continued)

(56) References Cited

U.S. PATENT DOCUMENTS 5,260,828 A * 11/1993 Londono .............. G02B 5/1876
359/565
5,479,292 A * 12/1995 Yoshikawa ............ G02B 13/14
250/353

(Continued)

FOREIGN PATENT DOCUMENTS

WO 2014197066 12/2014

OTHER PUBLICATIONS

U.S. Appl. No. 14/208,560, "Non-Final Office Action", dated Jun. 14, 2016, 9 pages.

(Continued)

*Primary Examiner* — Paulos M Natnael
(74) *Attorney, Agent, or Firm* — Kilpatrick Townsend & Stockton LLP

(57) ABSTRACT

The disclosure describes systems and apparatuses that include a focusable lens, as well as methods for focusing the optical lens. The focusable lens system includes a single element lens having a concave refractive surface characterized by a first radius of curvature and a convex refractive surface characterized by a second radius of curvature larger than the first radius of curvature. A detector element generates electrical signals representative of infrared rays refracted by the single element lens and incident on the detector element, and an aperture stop is disposed around an optical axis of the optical system and secured in a constant position relative to the detector element, the aperture stop configured to limit a cone angle of rays refracted by the single element lens. They system also includes image processing circuitry configured to generate digital pixilation data based on electrical signals generated by the detector element.

10 Claims, 4 Drawing Sheets

Related U.S. Application Data

(60) Provisional application No. 61/785,091, filed on Mar. 14, 2013.

(51) Int. Cl.
*H04N 5/33* (2006.01)
*H04N 5/225* (2006.01)

(58) Field of Classification Search
USPC .................................................. 348/164, 202
See application file for complete search history.

(56) References Cited

U.S. PATENT DOCUMENTS

| | | | | |
|---|---|---|---|---|
| 5,751,492 | A * | 5/1998 | Meyers | G02B 3/0043 359/619 |
| 6,563,567 | B1 * | 5/2003 | Komatsuda | G03F 7/70075 355/53 |
| 6,624,885 | B1 | 9/2003 | Pon et al. | |
| 6,982,834 | B2 * | 1/2006 | Sato | G02B 15/177 359/680 |
| 9,615,036 | B2 * | 4/2017 | Southerland | H04N 5/33 |
| 2003/0169491 | A1 * | 9/2003 | Bender | G02B 27/0101 359/356 |
| 2004/0070754 | A1 * | 4/2004 | Schuster | G01N 21/8851 356/237.6 |
| 2004/0150879 | A1 * | 8/2004 | Araki | G02B 17/0848 359/365 |
| 2005/0117496 | A1 * | 6/2005 | Ori | G11B 7/1275 369/112.08 |
| 2008/0180814 | A1 * | 7/2008 | Kawasaki | G02B 13/0035 359/716 |
| 2008/0273099 | A1 * | 11/2008 | Ono | H04N 5/23212 348/241 |
| 2010/0270469 | A1 * | 10/2010 | Johnson | G02B 7/10 250/330 |
| 2013/0235250 | A1 * | 9/2013 | Fainstain | H04N 5/23212 348/345 |
| 2014/0267764 | A1 | 9/2014 | Southerland et al. | |
| 2015/0351620 | A1 | 12/2015 | Ruppersberg et al. | |

OTHER PUBLICATIONS

U.S. Appl. No. 14/208,560 , "Notice of Allowance", dated Nov. 16, 2016, 7 pages.
U.S. Appl. No. 14/208,560 , "Restriction Requirement", dated Mar. 25, 2016, 7 pages.
PCT/US2014/025906 , "International Search Report and Written Opinion", dated Jan. 15, 2015, 10 pages.
PCT/US2014/025906 , "Invitation to Pay Add'l Fees and Partial Search Report", dated Nov. 6, 2014, 2 pages.

* cited by examiner

SINGLE ELEMENT RADIOMETRIC LENS

CROSS-REFERENCES TO RELATED APPLICATIONS

This application is a continuation of U.S. patent application Ser. No. 14/208,560, filed on Mar. 13, 2014 (now allowed), which claims priority to U.S. Provisional Patent Application No. 61/785,091, filed Mar. 14, 2013, and entitled "Single Element Radiometric Lens," the disclosure of which is hereby incorporated by reference in its entirety for all purposes.

BACKGROUND OF THE INVENTION

Thermographic cameras and imaging devices detect the spectrum and power of infrared radiation and use this information to form images. Instead of the 450-750 nanometer range of the visible light camera, infrared cameras may operate in wavelengths as long as 14,000 nm (14 µm).

Infrared energy is a part of the electromagnetic spectrum and encompasses radiation from gamma rays, x-rays, ultra violet, a thin region of visible light, infrared, terahertz waves, microwaves, and radio waves. These various categories of infrared radiation are related and differentiated in the length of their waves (wavelength). All objects emit a certain amount of infrared radiation, which changes as a function of object temperature.

In general, objects with higher temperatures emit more infrared radiation as black-body radiation. Infrared imaging systems detect this radiation much like an ordinary camera detects visible light. Infrared imaging systems have been used in various applications, particularly those operated in low light environments, such as those found at nighttime, in smoke-filled buildings, or underground. Infrared imaging has been valuable for military, rescue, and wildlife observations.

Despite the progress made in infrared imaging systems, there is a need in the art for improved methods and systems related to these systems.

SUMMARY OF THE INVENTION

The present invention relates generally to infrared imaging devices. More specifically, the present invention relates to single element radiometric lenses. The present invention is applicable to a variety of optical imaging systems.

According to an embodiment of the present invention, a focusable optical system having a single element, radiometric lens is provided. The single element, radiometric lens includes a concave refractive surface characterized by a first radius of curvature and a convex refractive surface characterized by a second radius of curvature, a detector element configured to generate electrical signals representative of infrared rays refracted by the lens and incident on the detector element, an aperture stop disposed around an optical axis of the optical system and secured in a constant position relative to the detector element, the aperture stop configured to limit a cone angle of rays refracted by the lens, and image processing circuitry configured to generate digital pixilation data based on electrical signals generated by the detector element.

The lens of the optical system may be configured to be focused by being displaced axially with respect to the optical axis of the optical system, and the aperture stop may be secured such that distance between the aperture stop and the detector element is not altered by focusing of the lens. The detector may be configured to be operable over a wavelength range of 8 µm to 14 µm, and an f-number of the optical system may be between 1 and 2.

According to another embodiment of the present invention, a method of operating a focusable optical system is provided. The method includes focusing the optical system on a first scene located a first distance from the optical system. Focusing the optical system on the first scene includes axially displacing a single element radiometric lens along an optical axis of the optical system. Axially displacing the single element radiometric lens includes moving a portion of the single element radiometric lens through an opening in an aperture stop. The method also includes focusing the optical system on a second scene located a second distance from the optical system. The second distance is greater than the first distance. Focusing the optical system on the second scene includes axially displacing the single element radiometric lens along the optical axis such that a portion of the single element radiometric lens is moved towards a detector within the optical system and is moved through the opening in the aperture stop.

Numerous benefits are achieved by way of the present invention over conventional techniques. For example, the present invention provides a single element radiometric lens. The single element design can facilitate high image quality, while minimizing the system complexity. The simplified design and manufacturing process can facilitate cost savings as compared with more complex, multi-lens designs. Furthermore, in view of specifications such as the f-number, field-of-view, and detector size that can be attained through incorporation of aspects of this disclosure, this single lens can be made quite small.

The small lens size facilitates use of the lens within a smaller camera body having a compact design. The small lens size also results in manufacturing efficiencies associated with diamond point turning, grinding and polishing, or molding during fabrication of the lens. These and other embodiments of the invention along with many of its advantages and features are described in more detail in conjunction with the text below and attached figures.

DETAILED DESCRIPTION OF SPECIFIC EMBODIMENTS

The present disclosure relates to an infrared imaging system, such as a thermographic camera, having a focusable, single element, radiometric lens and an aperture stop. This disclosure describes and illustrates several example embodiments of this system. However, the described embodiments are exemplary and provided for explanatory purposes only. The scope of this disclosure is intended to cover any other such optical systems, elements, or components, the design of which could be inferred from, or informed by, the information and descriptions presented in this disclosure.

During focusing of the infrared imaging system, the lens can be moved back and forth along the optical axis, while the aperture stop and detector are disposed in fixed positions relative to each other. In this way, the brightness of the image is unchanged by movement of the lens to different positions over the focusing range.

The thermographic camera lens may be a single element f/1.5 germanium lens providing a 40°×30° field-of-view for a 320×240 detector with a 17-micron pixel pitch. However the concepts that will be described herein can be easily and practically applied to systems that exhibit other specifications, and any such system shall be understood as being within the contemplated scope of this disclosure for all purposes.

The focusable radiometric lens comprises an optical element fabricated from a single piece of refractive material (e.g., germanium, glass, plastic, or the like). The fabrication process may involve machining the lens using diamond machining on a high precision lathe. For this reason, it is preferable for the lens to have a minimum size consistent with the optical performance characteristics and specifications sought for a particular infrared imaging system embodying aspects of this disclosure. By minimizing the lens size, the lathing and other processing times associated with manufacturing the lens may be reduced, thereby resulting in cost savings.

The fixed position of the aperture stop relative to the sensor results in substantially constant illumination being admitted to the image plane when the infrared imaging system is directed to a constant scene, even while the focus position of the lens is changed. As a result of the fixed position of the aperture stop, the f-number of the infrared imaging system is the same for all focus positions of the lens. This performance characteristic is especially beneficial in thermography because of the need for radiometric accuracy throughout all focus positions.

Figure 1:
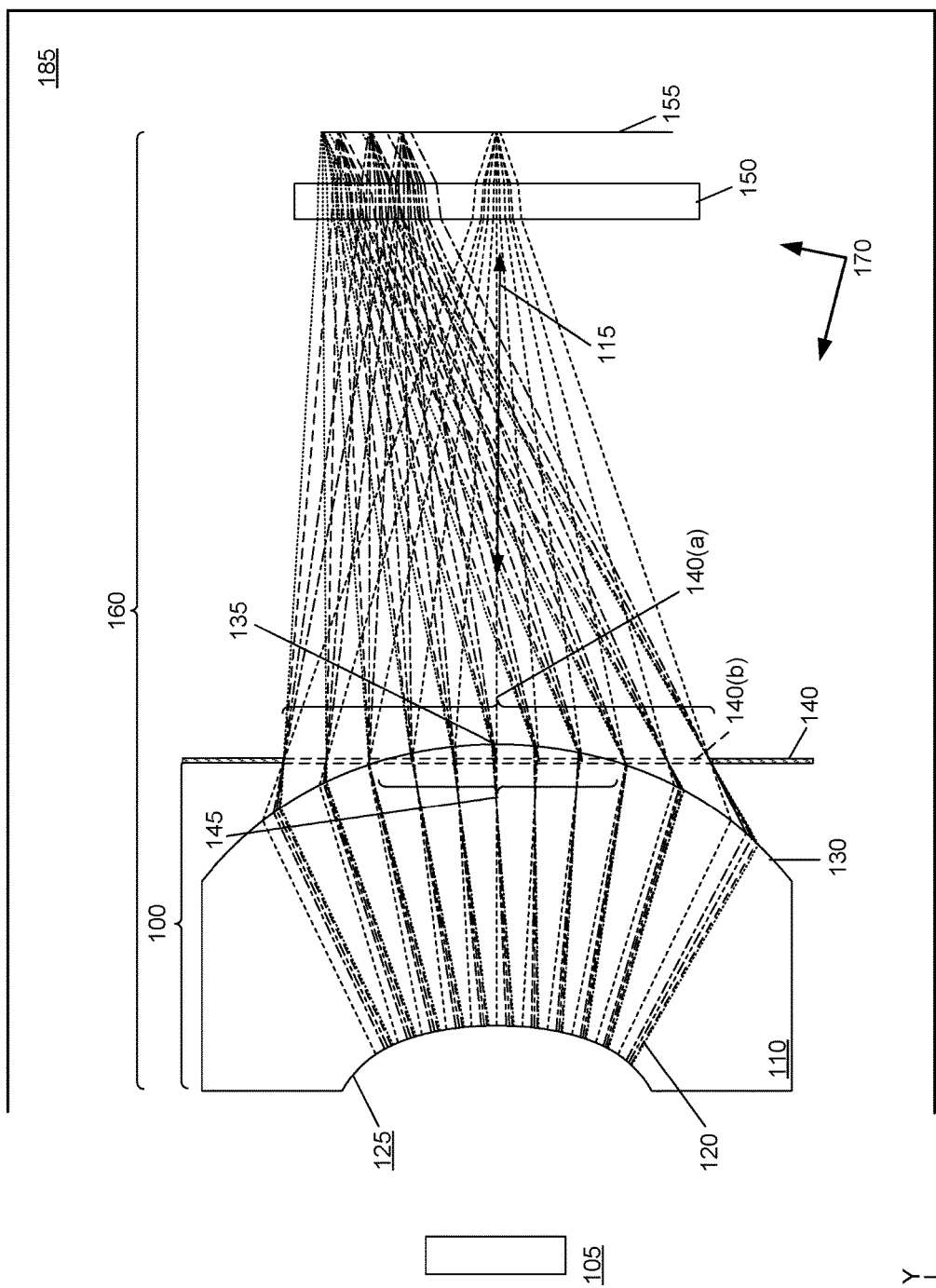
FIG. 1 is a generalized illustration of an example infrared imaging system including a single element radiometric lens and aperture stop configured as described in this disclosure.

FIG. 1 is a high level schematic diagram illustrating certain optical components of an example optical system 160 for infrared imaging. The optical system 160 has a single element radiometric lens 110 and aperture stop 140. The optical system 160 is part of a larger overall infrared imaging system 185. In addition to the optical system 160, the infrared imaging system 185 includes image processing, memory, interface and display elements (not shown in FIG. 1, but specifically depicted in FIG. 3) configured to handle image data generated by the optical system.

In FIG. 1, the optical system 160 is shown being focused on an object 105 that emits infrared radiation. Infrared rays 120 radiated from object 105 are incident on the radiometric lens 110, which refracts the rays towards an image plane (also referred to as a focal plane), where a detector 155 is positioned.

The radiometric lens 110 is a single element lens, and is disposed perpendicularly to the optical axis 115. The optical axis 115 passes through the center of curvature of each surface of the radiometric lens 110. The radiometric lens 110 may be displaced along the optical axis 115 to focus the optical system 160. Focusing in this manner causes the distance of the lens 110 relative to both the detector 155 and aperture stop 140 to change.

The radiometric lens 110 may be formed of germanium, zinc selenide, zinc sulfide, or any one of several other suitable (e.g., moldable) materials (e.g., chalcogenides). The radiometric lens 110 includes a first and second refractive surface, as depicted at 125 and 130, respectively. As between the first and second refractive surface 125, 130, the first refractive surface 125 of the lens 110 is located furthest from the detector 155. The first refractive surface 125 is concave and is characterized by a first radius of curvature. In an embodiment, the dimensions of the first refractive surface 125 measured in the transverse plane can be slightly oversized to account for manufacturing tolerances (e.g., ±0.0006" given a ±0.001" sag tolerance).

The second refractive surface 130 of the radiometric lens 110 is convex. The second refractive surface 130 may be characterized by a second radius of curvature and a vertex 135 which is closer to the detector 155 than all other points on the lens. Both the first and second refractive surface 125, 130 may be spherical, aspherical or diffractive.

Bundles of rays 120 pass through the lens 110 and travel in the direction of the detector 155. However, prior to reaching the detector 155, some of the rays 120 at the periphery of each ray bundle are blocked by the aperture stop 140 and never reach the detector 155. In this way, the aperture stop 140 serves to limit the cone angle of the rays that come to focus at the image plane.

The aperture stop 140 is rounded, and is disposed in a plane perpendicular to the optical axis 115. The aperture stop 140 is rigidly held in a fixed position with respect to the detector 155. Hereinafter, the plane in which the aperture stop 140 is disposed will be referred to as the aperture plane (not specifically enumerated). The aperture stop 140 has a round opening 140(b) through which admitted rays pass through prior to reaching the image plane. For example, the opening may have a 0.358 inch diameter, represented by the measurement at 140(a).

As described previously, the lens 110 is disposed so as to be displaceable along the optical axis of the optical system 160, and may be moved towards and away from the detector 155 to bring an image into focus. The optical system 160 is designed such that, at a range of positions near the optical infinity focusing position, the lens 110 protrudes through the opening 140(b) of the aperture stop 140, causing a portion of the lens 110 to be on the detector 155 side of the aperture plane. FIG. 1 depicts one such disposition of the lens 110 within this focusing range. In the depicted disposition of the lens 110, a portion 145 of the second refractive surface 135 is in the aperture plane, with a small gap separating it from the aperture stop 140.

As the lens 110 is progressively moved towards the detector 155, thereby decreasing the distance from the lens to the detector and focusing the infrared imaging system 185 at a greater distance, the portion of the lens 110 located on the detector 155 side of the aperture plane increases. Simultaneously, at the aperture plane, the gap between the second refractive surface 130 and the inner edges of aperture stop 140 decreases. At the extreme of the focusing range, when the infrared imaging system 185 is focused at infinity, a small gap remains between the aperture stop 140 and the portion 145 of the second refractive surface 130 in the aperture plane. The dimensions of the optical system 160 components may be selected so that the portion 145 of the lens 110 located on the detector 155 side of the aperture plane is 0.014 inches wide, as measured from the vertex 135 along the optical axis 115.

Rays 120 that are admitted through the aperture stop 140 pass through a window 150 on their way to the detector 155. The window 150 may be constructed of germanium, silicon or any other material suitable for the specific operating environment and performance characteristics intended for the infrared imaging system 185. The aperture stop 140 can be coupled to the window 150 so as to ensure that these components do not move relative to one another.

After rays 120 pass through the window 150, the rays pass through a hermetically sealed passage (not shown) forward of the detector 155. The detector 155 may be an array sensor (e.g., a focal plane array operating in the infrared band), bolometer or any other sensor suitable for converting infrared rays to an electrical signal representative of the ray intensity. The detector 155 operates in a vacuum environment in some implementations, with the window serving as a transmissive element of a hermetically sealed package.

The curvature and thickness 100 of the lens 110 and the aperture diameter (distance across opening 140(b)) of the aperture stop 140 are optimized so as to enable a narrowest lens capable of generating a sharp image of objects 105 throughout the focusing range. An f number of f/1.5 has been shown to be a preferred parameter for orienting this optimization. The focal length of the lens 110 can be set relative to the aperture stop 140 dimensions so as to achieve an f-number that is appropriate for the specific operating environment of the infrared imaging system 185.

Because the lens 110 is radiometric, as the object 105 moves relative to the infrared imaging system 185 (e.g., from infinity to 200 millimeters away), the image focus is adjusted by displacing the lens 110 along the optical axis 115, towards or away from the detector 155. As this occurs, the fixed attachment of the aperture stop 140 and the detector 155 results in the separation between these elements being constant. Thus, provided that the radiation pattern of the object 105 remains constant, a steady amount of infrared radiation impinges on detector 155 and the image brightness of the object will be unaffected by its movement.

Additionally, the curvature of the second refractive surface 135 may be set so that total internal reflection is avoided at the lens periphery, and the admitted rays fill the aperture plane. By filling the aperture plane with admitted rays, imaging errors may be avoided.

FIG. 1 also depicts example dimensions of components in the infrared imaging system 185, as well as system-wide dimensions, which have proven to enable positive infrared imaging performance to be achieved with a small lens 110. For example, the total length of the infrared system 185 may be 20.45 millimeters (mm) with a lens diameter of 12.6 mm or 0.496 inches, focal length of 7.47 mm or 0.294 inches, and weight of 3.87 grams. The f-number can be 1.5. The operating wavelength range of the lens is in the long wave-infrared region of 8μm to 14 μm, or mid wave-infrared region of 3μm to 5μm, in some embodiments.

Figure 2:
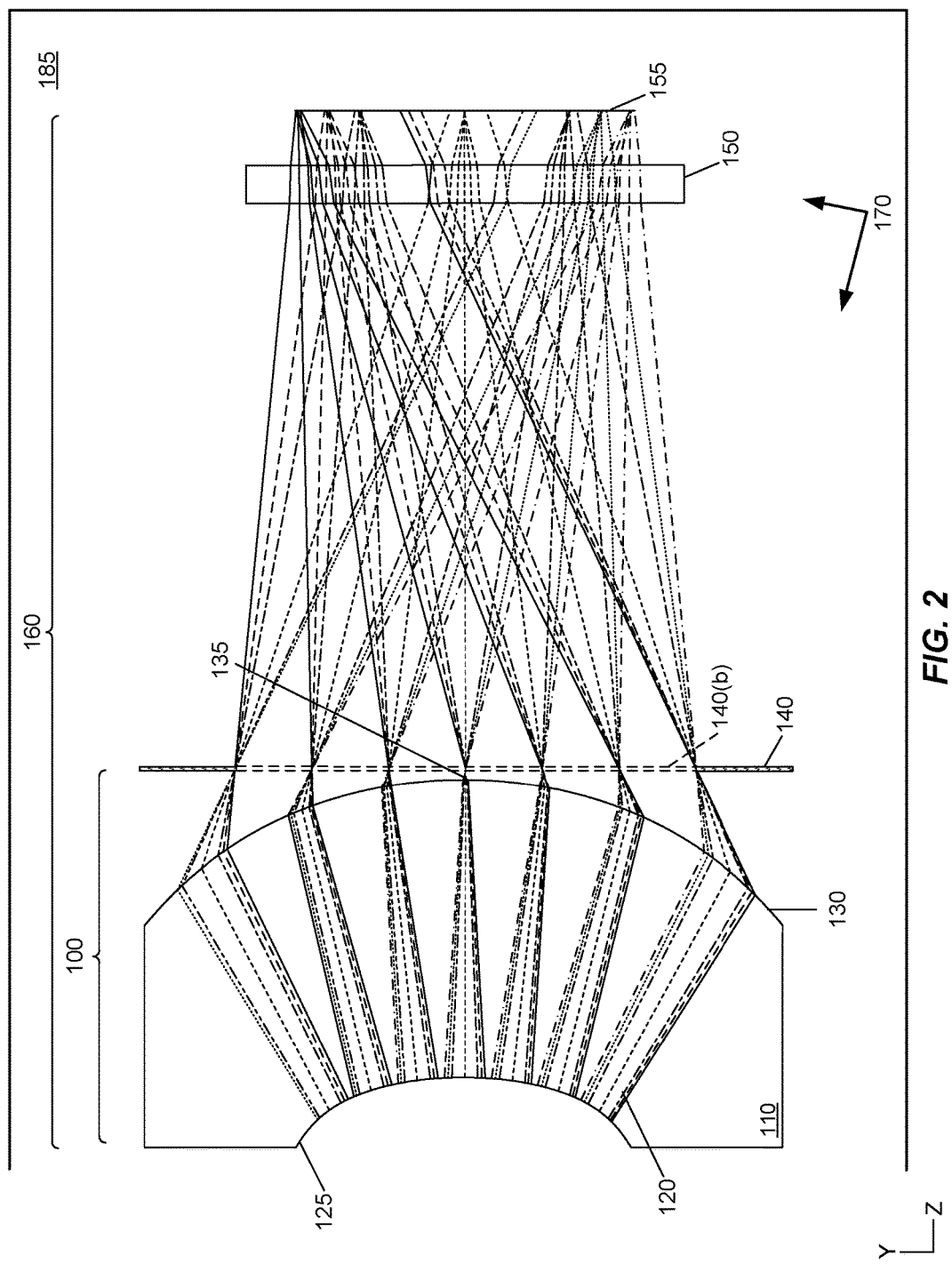
FIG. 2 is a generalized illustration of an example infrared imaging system being focused on a near scene.

FIG. 2 is a high level illustration of the infrared imaging system 185 being focused on a nearer scene than in FIG. 1. Components depicted in FIG. 2 that are the same as the components depicted in FIG. 1 are enumerated accordingly. Because example functionality, design and structure of the components was described previously, this information will not be further mentioned in the discussion of FIG. 2.

Consistent with the near scene focus position of lens 110 in FIG. 2, the lens 110 is depicted as not protruding through the opening 140(b) provided by aperture stop 140. The entire lens 110 is depicted to the left of the aperture stop 140 and the aperture plane.

Although the infrared imaging system 185 is depicted as being focused on a near scene in FIG. 2, the radius of curvature of the second refractive surface 130 is such that rays that are refracted by the lens 110 fill the opening 140(b) provided by aperture stop 140. This phenomenon, which is also depicted in FIG. 1, is achieved by using the largest outer refractive surface 130 radius of curvature for which total internal reflection is avoided at the periphery of the lens 110.

Figure 3:
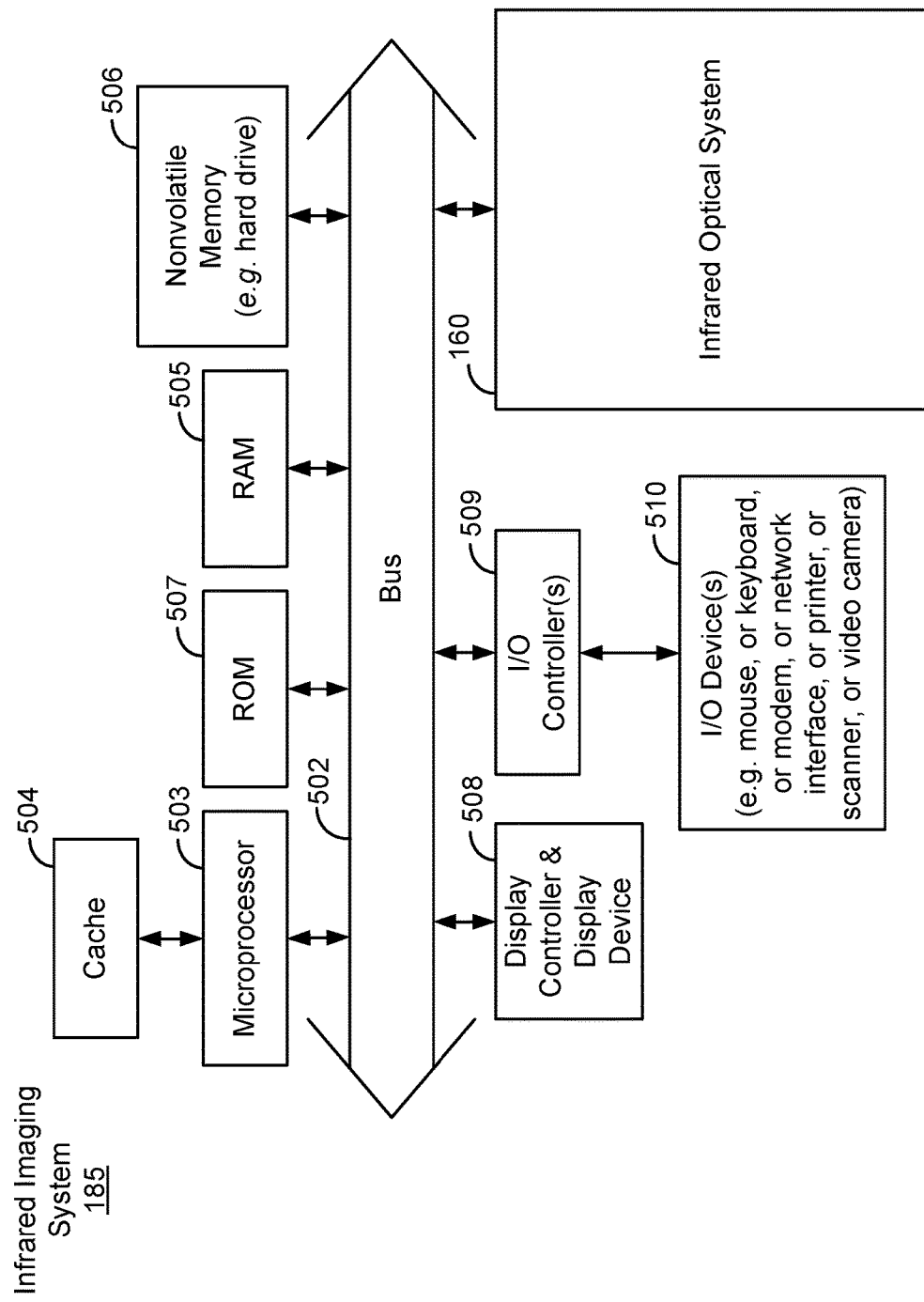
FIG. 3 is a high level schematic diagram illustrating an image processing subsystem for processing image data generated by an infrared imaging system.

FIG. 3 is a high level schematic diagram illustrating image processing components used to provide image processing functionality within the infrared imaging system 185. Although FIG. 3 illustrates various example image processing components that may be used within the infrared imaging system 185, this drawing is not intended to represent any particular architecture or manner of interconnecting the components, as such details are not germane to the techniques described herein. The image processing components may be disposed within a personal computer (PC), workstation, tablet, smartphone or other computing environment suitable for processing data generated by an optical system 160.

As depicted in FIG. 3, the image processing components include a system bus 502 which is coupled to a microprocessor 503, a Read-Only Memory (ROM) 507, a volatile Random Access Memory (RAM) 505, as well as other nonvolatile memory 506. In the illustrated embodiment, microprocessor 503 is coupled to cache memory 504. System bus 502 can be adapted to interconnect these various components and also to connect components 503, 507, 505 and 506 to a display controller and display device 508 and peripheral interfaces such as input/output ("I/O") devices 510. The I/O devices 510 may be components such as keyboards, modems, network interfaces, printers, scanners, video cameras, or other devices suitable for interfacing with image processing components. Typically, I/O devices 510 are coupled to the system bus 502 through I/O controllers 509.

In one embodiment the I/O controller 509 includes a Universal Serial Bus ("USB") adapter for controlling USB peripherals or other type of bus adapter.

RAM 505 can be implemented as dynamic RAM ("DRAM") which requires power continually in order to refresh or maintain the data in the memory. The other nonvolatile memory 506 can be a magnetic hard drive, magnetic optical drive, optical drive, DVD RAM, flash memory, or other type of memory system that maintains data after power is removed from the system. While FIG. 3 shows that nonvolatile memory 506 as a local device coupled with the rest of the components in the data processing system, it will be appreciated by skilled artisans that the described techniques may use a nonvolatile memory remote from the infrared imaging system 185, such as a network storage device coupled with the data processing system through a network interface such as a modem or Ethernet interface (not shown).

Figure 4:
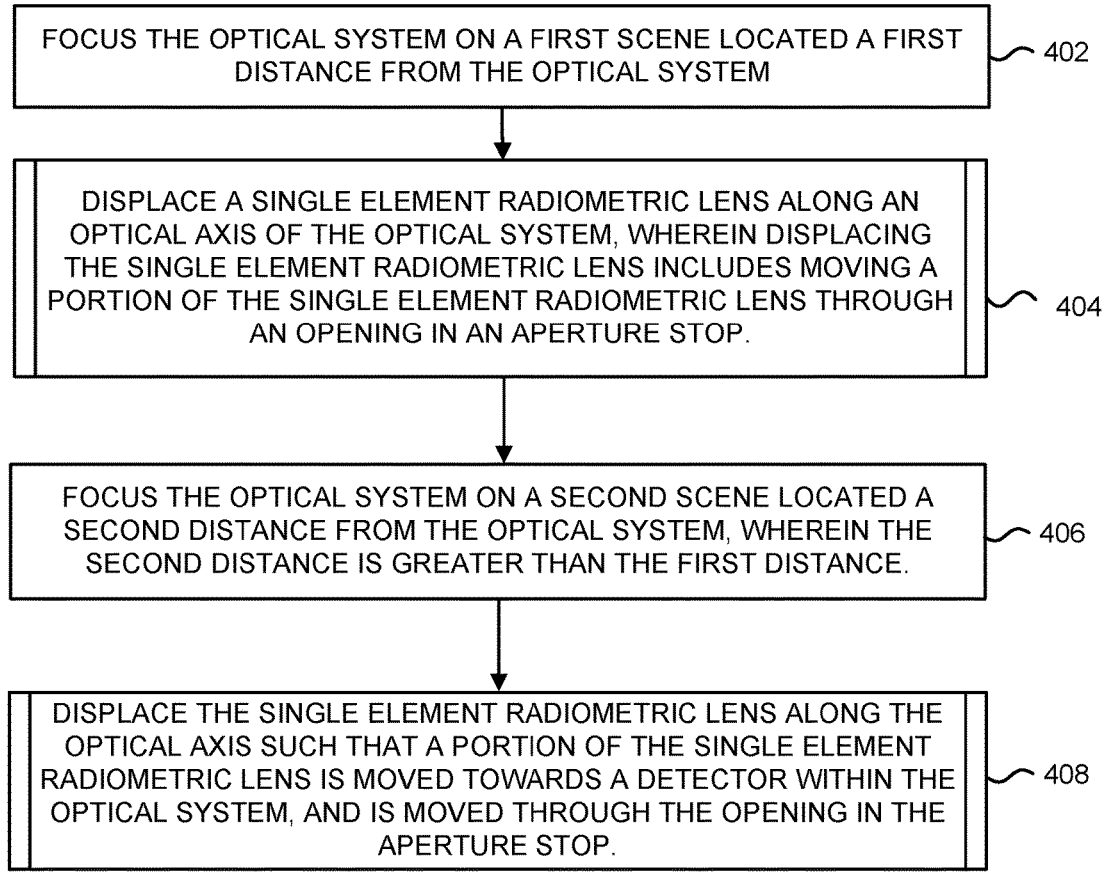
FIG. 4 is a flow diagram depicting operations for focusing the infrared imaging system described herein.

FIG. 4 is a block diagram illustrating example operations for operating the infrared imaging system 185. As depicted at 402 in FIG. 4, the optical system is focused on a first scene located a first distance from the optical system. As depicted at 404, focusing includes displacing a single element radiometric lens axially, along an optical axis of the optical system. Axially displacing the single element radiometric lens includes moving a portion of the single element radiometric lens through an opening in an aperture stop. At 406, the optical system is focused on a second scene located a second distance from the optical system. The second distance is greater than the first distance. The focusing described at 406 includes displacing the single element radiometric lens axially along the optical axis, as shown at 408. The lateral movement of the radiometric lens is such that a portion of the single element radiometric lens is moved towards a detector within the optical system, and is moved through the opening in the aperture stop.

With these embodiments in mind, it will be apparent from this description that certain components of the described infrared imaging system may be embodied, at least in part, in software, hardware, firmware, or any combination thereof. It should also be understood that any of these components may interface with various computer-implemented functions involving data stored in a data processing system.

Additionally, certain techniques may be carried out in a computer or other data processing system by executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments of the systems described herein may also be in the form of computer code stored on a computer-readable medium. Computer-readable media can also be adapted to store computer instructions, which when executed by a computer or other data processing system, such as data processing system 500, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a focusable optical system including a single element radiometric lens, a detector, and an aperture stop having an opening, the method comprising:
    positioning the single element radiometric lens at a first distance from the detector, wherein at the first distance, the single element radiometric lens focuses on a first scene located at a first object distance; and
    axially displacing the single element radiometric lens towards the detector to position the single element radiometric lens at a second distance from the detector, wherein at the second distance:
        the single element radiometric lens focuses on a second scene located at a second object distance greater than the first object distance; and
        a portion of the single element radiometric lens passes though the opening in the aperture stop.

2. The method of claim 1, wherein positioning the single element radiometric lens at a first distance from the detector locates all of the single element radiometric lens to a first side of the aperture stop, wherein the detector is disposed on a second side of the aperture stop, the first side opposite the second side.

3. The method of claim 1, wherein the detector is operable over a wavelength range of 8 to 14 µm.

4. The method of claim 1, wherein an f-number of the focusable optical system is between 1 and 2.

5. The method of claim 1, wherein the single element lens comprises germanium.

6. The method of claim 1, wherein axially displacing the single element lens does not alter a distance between the detector and the aperture stop.

7. The method of claim 1, wherein the focusable optical system further comprises a window.

8. The method of claim 7, wherein the window comprises germanium.

9. The method of claim 7, wherein the window is coupled to the aperture stop.

10. The method of claim 1, wherein the detector comprises an array sensor.

* * * * *